April 5, 1927.  1,623,236

W. C. DE ROO

FRICTION CLUTCH

Filed Jan. 9, 1925  2 Sheets-Sheet 1

INVENTOR
William C. DeRoo
ATTORNEY

April 5, 1927.
W. C. DE ROO
1,623,236
FRICTION CLUTCH
Filed Jan. 9, 1925
2 Sheets-Sheet 2
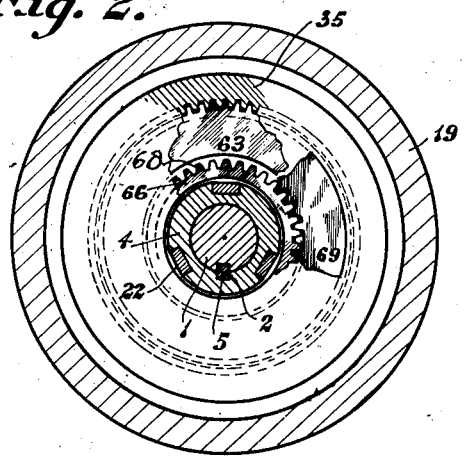
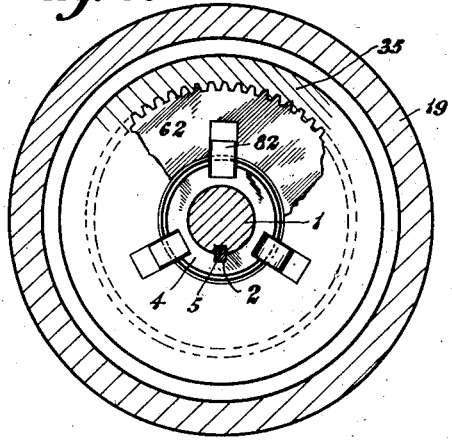
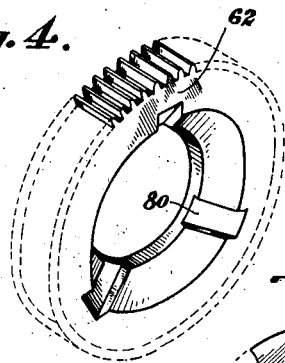
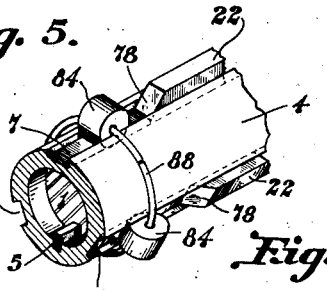
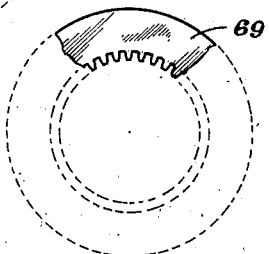
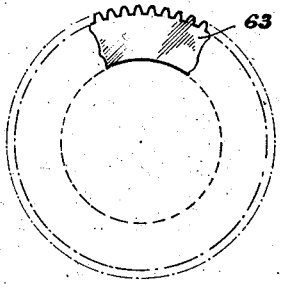
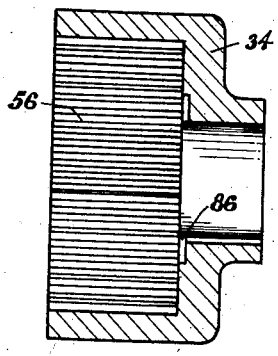
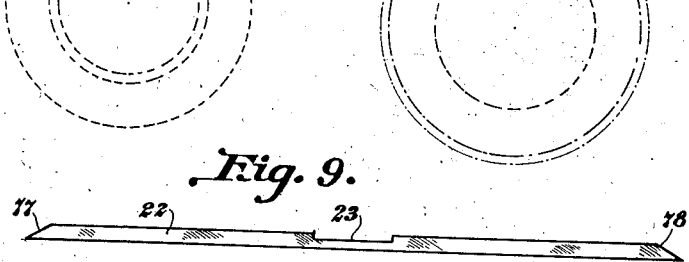
INVENTOR
William C. DeRoo
BY James N. Ramsey
ATTORNEY Patented Apr. 5, 1927.

1,623,236

UNITED STATES PATENT OFFICE.

WILLIAM C. DE ROO, OF CINCINNATI, OHIO, ASSIGNOR TO THE DRESES MACHINE TOOL COMPANY, OF CINCINNATI, OHIO, A CORPORATION OF OHIO.

FRICTION CLUTCH.

Application filed January 9, 1925. Serial No. 1,397.

My invention relates to friction clutches, particularly, though not exclusively, adapted for use in driving and reversing the direction of rotation of the spindle of a radial drill.

The objects of my invention are to provide a simple, practical, efficient and durable friction clutch; to provide efficient and positive manually operative means adapted to contract said clutch; to provide manually operative adjustable means whereby the engaging pressure of the contracting parts of said clutch is regulated; to provide a friction clutch adapted for efficient use in combination with high or low speed mechanism; and to provide a simple and durable construction and assemblage of the various parts of said clutch, whereby great facility of operation and simplicity of control is accomplished.

My invention consists in providing a friction clutch mounted upon a pair of sleeves having a plurality of spaced apart grooves therein and said grooves, respectively having manually operative wedge members slidable therein and adapted to force suitable members into frictional engagement with parts of said clutch whereby the clutch disks are forced into frictional engagement with one another.

My invention further consists in the construction, combination, location and arrangement of parts, as herein set forth and claimed.

In the drawings:

Fig. 2 is a section taken on a line corresponding to 2—2 in Fig. 1 with parts broken away;

Fig. 3 is a section taken on a line corresponding to 3—3 in Fig. 1 with parts broken away;

Fig. 4 is a perspective of a beveled disk with parts shown in dotted lines;

Fig. 5 is a perspective of the outer end of a sleeve partly broken away;

Fig. 6 is a side elevation of a friction disk;

Fig. 7 is a side elevation showing a modified form of a friction disk;

Fig. 8 is a longitudinal section of a clutch hub; and

Fig. 9 is a side elevation of a wedge.

Figure 1:
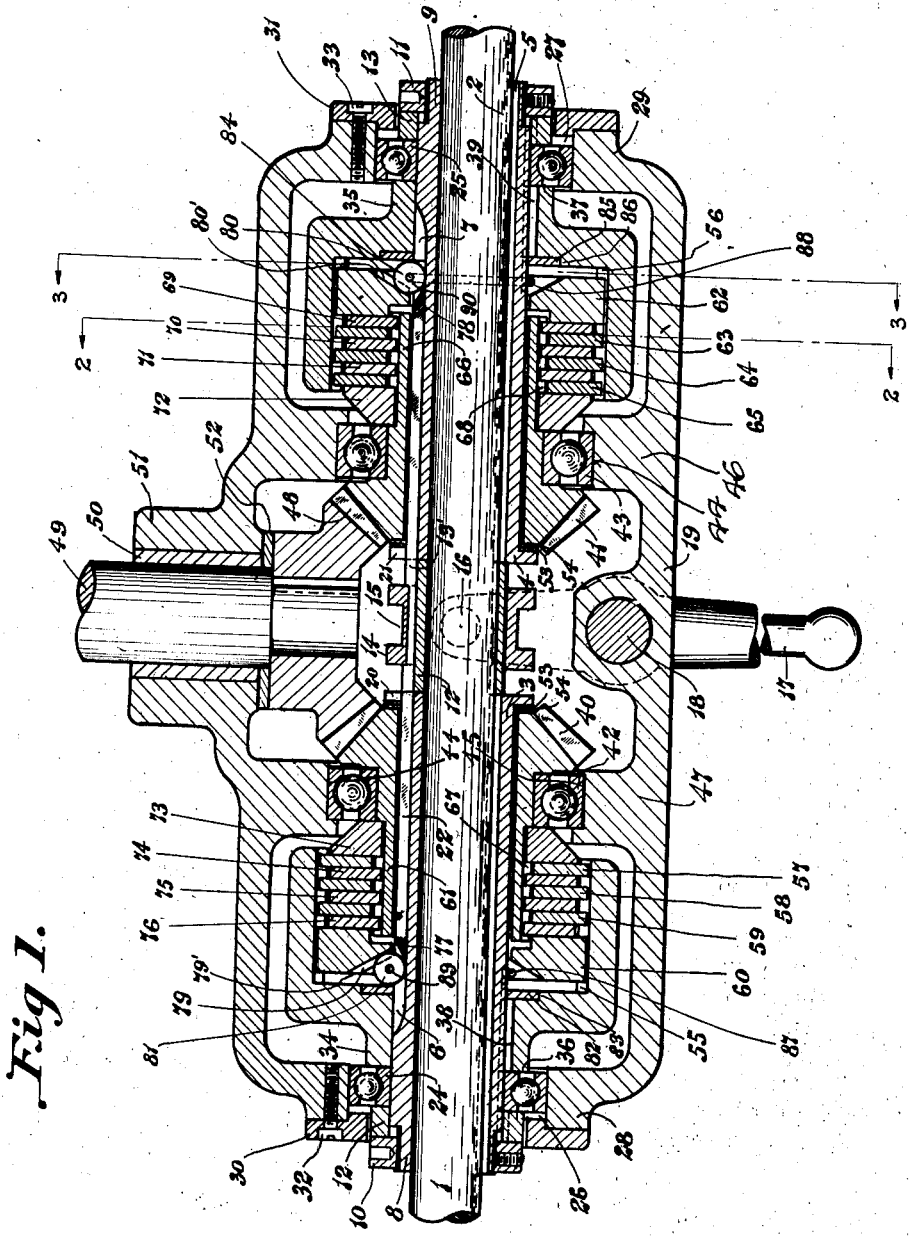
Fig. 1 is a longitudinal section of my invention with parts broken away.

In the preferred construction of my invention I provide driving shaft 1 having longitudinal groove 2, therein, whereby sleeves 3 and 4, slidably mounted on the shaft, are keyed thereto by key 5. Sleeves 3 and 4, respectively, are provided with spaced apart and parallel longitudinal external grooves 6 and 7 and have their respective outer ends 8 and 9 externally threaded for respectively receiving nuts 10 and 11, respectively, maintained thereon by lock washers 12 and 13. Intermediate sleeves 3 and 4, and slidably mounted on driving shaft 1, is spacing sleeve 12' which maintains sleeves 3 and 4 in spaced apart relation to each other. Spacing sleeve 12' has parallel spaced apart longitudinal external grooves 13' therein and respectively in alinement with grooves 6 and 7, respectively, in sleeves 3 and 4. Collar 14 mounted on spacing sleeve 12' has circumferential groove 15 therein for receiving usual fork 16 having integral hand lever 17 pivotally mounted by pivot 18 to casing 19, whereby operation of the hand lever is adapted to slide collar 14 longitudinally of shaft 1 and on spacing sleeve 12'. Sleeves 3 and 4, respectively, are provided at their inner ends with integral flanges 20 and 21 for the purpose of providing a stop against further movement of collar 14 when it is positioned adjacent an edge of the spacing sleeve. Wedges 22 slidably mounted in alined grooves 6, 13' and 7, respectively, in sleeve 3, spacing sleeve 12' and sleeve 4, project slightly out of the grooves and respectively have slots 23 therein into which collar 14 is fitted, whereby longitudinal movement of the collar relative to shaft 1 slides the wedges longitudinally in grooves 6, 13' and 7, respectively, for purposes hereinafter fully explained.

The outer ends 8 and 9, respectively, of sleeves 3 and 4 are respectively rotatably mounted in annular bearings 24 and 25, respectively, retained against outward movement in holes 26 and 27, respectively, in ends 28 and 29 of casing 19 by contact with the lock washers. Dust caps 30 and 31, respectively, retained in engagement with ends 28 and 29 in the casing by screws 32 and 33, are closely fitted relative to the adjacent parts for the purpose of excluding dust and other foreign matter from within the casing.

Clutch driving hubs 34 and 35, respectively, having their outer ends 36 and 37 in engagement with annular bearings 24 and 25, respectively, are keyed to sleeves 3 and 4, respectively, by keys 38 and 39. Driven bevel gears 40 and 41, respectively, are mounted in annular bearings 42 and 43 suitably journaled, respectively, in recesses 44 and 45, respectively, in webs 46 and 47 of casing 19. Bevel gear 48, in mesh with both bevel gears 40 and 41, is keyed to shaft 49 journaled in bearing 50 in boss 51 of the casing. Thrust collar 52, positioned around shaft 49 and interposed between gear 48 and boss 51, is for the purpose of receiving the outward thrust of gear 48.

Disks 53 and 54, respectively, positioned between gear 40 and flange 20 and between gear 41 and flange 21, are for the purpose of receiving the inward thrust of bevel gears 40 and 41, respectively.

Clutch driving hubs 34 and 35, respectively, have internal driving teeth 55 and 56. The driving teeth 55 are in mesh with and are adapted to rotate spaced apart disks 57, 58, 59 and 60 rotatably mounted about extended hub 61 of gear 40. The driving teeth 56 are in mesh with and are adapted to rotate spaced apart disks 62, 63, 64 and 65 rotatably mounted about extended hub 66 of gear 41. Extended hubs 61 and 66, respectively, of gears 40 and 41, respectively, are provided with external driving teeth 67 and 68. Disks 69, 70, 71 and 72, respectively, positioned adjacent friction disks 62, 63, 64 and 65 are in mesh with teeth 68 of bevel gear 41 and when pressure is exerted on disk 62 by manually operative means, hereinafter fully explained, the frictional engagement of the respective disks is adapted to rotate bevel gear 41 which is in mesh with bevel gear 48 having driven shaft 49 fixed thereto, whereby the spindle shaft (not shown) is rotated.

Friction disks 73, 74, 75 and 76, respectively, positioned adjacent friction disks 57, 58, 59 and 60 are in mesh with teeth 67 of bevel gear 40 and when pressure is exerted on disk 60 by manually operative means, hereinafter fully explained, the frictional engagement of the respective disks is adapted to rotate gear 40 which imparts rotary movement to meshing gear 48 which in turn imparts rotary movement to driven shaft 49. The direction of rotation of the spindle shaft, in the latter case, is opposite to its direction of rotation when gear 41 imparts rotary movement to gear 48.

When collar 14 is in neutral position beveled ends 77 and 78, of wedges 22, respectively, extend approximately to the center of disks 60 and 62, respectively, having angular or chamfered grooves 79 and 80 which, respectively, terminate in grooves 6 and 7, respectively, in sleeves 3 and 4. Positioned in each groove 6 and having its outer side extending into the adjoining chamfered groove 79 of disk 60, is cylindrical roller 81 adapted to be engaged by adjacent beveled end 77 of wedge 22 when lever 17 is operated for sliding collar 14 toward end 28 of casing 19, whereby roller 81 is forced outwardly in engagement with hardened steel collar 82 (received in circular recess 83 in the clutch driving hub) and in contact with adjacent disk 60. Positioned in each groove 7 and having its outer end extending in the adjoining chamfered groove 80 is cylindrical roller 84 adapted to be engaged by adjacent beveled end 78 of wedge 22 when lever 17 is operated for sliding collar 14 towards end 29 of casing 19, whereby roller 84 is forced outwardly into engagement with hardened steel collar 85 (received in circular recess 86 in the clutch driving hub) and in contact with adjacent disk 62.

When lever 17 is operated for sliding collar 14 toward end 28 of casing 19 beveled ends 77, respectively of wedges 22, respectively, simultaneously force rollers 81, respectively, outwardly in chamfered grooves 79, whereby a uniform pressure is imparted to disk 60 by the contacting rollers, and disk 60 is forced into uniform contacting engagement with adjacent disk 76. Further continued movement of lever 17 causes end 77, respectively, of wedges 22 to exert sufficient pressure on rollers 81 whereby disks 60, 76, 59, 75, 58, 74, 57 and 73 are forced into frictional contact with one another thereby imparting rotary movement to bevel gear 40. When lever 17 is operated for sliding collar 14 toward end 29 of casing 19 beveled ends 78, respectively, of wedges 22, respectively, simultaneously force rollers 84, respectively, outwardly in chamfered grooves 80 whereby uniform pressure is imparted to disk 62, and disks 62, 69, 63, 70, 64, 71, 65 and 72 are forced into frictional contact with one another, thereby imparting rotary movement to driven shaft 49 through bevel gear 41 and bevel gear 48. For the reason that shaft 1 is adapted to rotate continuously in one direction and bevel gear 48 is in mesh with both bevel gears 40 and 41, when lever 17 is operated for causing ends 77 respectively, of wedges 22 to wedge cylindrical rollers 81 in contact with disk 60 a direction of rotation is imparted to driven shaft 49 which is opposite to its direction of rotation when lever 17 is operated for forcing ends 78, respectively, of wedges 22 in actuating engagement, respectively with rollers 84. The direction of rotation of driven shaft 49 is, therefore, controlled by manual operation of lever 17. Circular spring members 87 and 88, respectively, received in holes 89 and 90, respectively, in rollers 81 and 84 are for the purpose of retracting the rollers, respectively, into close engagement with sleeves 3 and 4 when the respective engaging beveled ends of wedges 22 disengage the adjacent rollers.

The mechanical operations of my invention are as follows:

Assume manually operated hand lever 17 is in neutral position, as shown in Fig. 1, and that shaft 1 is rotating.

Hand lever 17 is pivotally mounted in casing 19 and has integral fork 16 positioned in circumferential groove 15 in collar 14, slidably mounted on spacing sleeve 12', and fitted into slots 23, respectively, in wedges 22. Manual operation of the hand lever is adapted to slide the respective wedges in grooves 6 and 7 longitudinally of driving shaft 1. Assume the direction of movement of hand lever 17 imparts a directional movement of the wedges toward end 28 of casing 19. Beveled ends 77, respectively, of wedges 22, respectively, engage cylindrical rollers 81, respectively, positioned in grooves 6, respectively, in sleeve 3, thereby forcing the respective rollers in engagement with steel collar 82 and in chamfered or angular grooves 79 of disk 60, whereby through frictional engagement of disks 60, 76, 59, 75, 58, 74, 57 and 73, bevel gear 40 is rotated thereby imparting rotary movement to driven shaft 49 through meshing bevel gear 48. When it is desired to reverse the direction of rotation of driven shaft 49, lever 17 is manually operated, withdrawing beveled ends 77, respectively, of wedges 22 from angular grooves 79 simultaneously engaging beveled ends 78, respectively, of the wedges with rollers 84 thereby forcing the rollers into chamfered or angular grooves 80 in disk 62, whereby frictional engagement of disks 62, 69, 63, 70, 64, 71, 65 and 72 causes the rotation of bevel gear 41 which imparts rotary movement to driven shaft 49 through meshing bevel gear 48. When it is desired to stop the rotary movement of driven shaft 49 collar 14 is slid on spacing sleeve 12' into a neutral position by manual operation of lever 17 to the position shown in Fig. 1, whereby beveled ends 77 and 78, respectively of wedges 22 are caused to disengage the respective rollers 81 and 84 and permit springs 87 and 88, respectively, to retract the rollers into their normal position and, respectively, within grooves 6 and 7, whereby shaft 1 is permitted to continue its rotation without imparting rotary movement to bevel gears 40 or 41.

It is apparent that I have invented a simple and efficient frictional clutch particularly adapted to impart rotary movement in the drill spindle of a radial drill, whereby the direction of rotation of the drill spindle is controlled by manual operation of a conveniently positioned hand lever.

If desired, cylindrical rollers 81 and 84 may be substituted by spherical members with efficient and satisfactory results. Also, the beveled sides 79' and 80', respectively, of disks 60 and 62 may be eliminated, as spaced apart chamfered or angular inclined grooves 79 and 80, respectively, in disks 60 and 62 are adapted to produce the required results of permitting the rollers to wedge the respective disks into clutching engagement with one another.

When the respective disks, after a period of time through frictional contact, are worn thin, nuts 10 and 11, respectively, threaded to outer ends 8 and 9 of sleeves 3 and 4, may be screwed inwardly thereby sliding lock washers 12 and 13, respectively, in engagement with annular bearings 24 and 25 which in turn, respectively, slide friction hubs 34 and 35 inwardly thereby reducing the space between the respective disks. By proper adjustment of nuts 10 and 11 the clutch disks are properly positioned with respect to one another for efficient operation of the clutches.

While I have shown my invention in two separate units adapted for combination use in imparting forward and reverse rotary movement to a drill spindle, it is apparent that a single unit may be utilized in operative connection with desirable mechanism in a suitable location where a clutch of this kind is required and when only one direction of rotation of a shaft or driven member is required.

An advantage of my invention is that the various parts are unadapted to readily get out of order. Furthermore, when, after extended use the clutching disks become worn a simple method is provided for readjusting the clutch and which comprises screwing nuts 10 and 11 inwardly. The nuts 10 and 11 are positioned outside casing 19 whereby it is unnecessary to disassemble the clutch to make the required adjustments. Cylindrical rollers 81 and 84 are made of hardened steel and are adapted to render long and continuous service, respectively, in contact with hardened steel collars 82 and 85 without becoming worn sufficiently to require their replacement. The compactness of the clutch is another advantage of my invention, as only a small space is required for its operative connection with other mechanism.

While I have chosen to illustrate the form and construction of the invention by the herein drawings and explanations of the same, I desire to emphasize the fact that the form of construction and explanations, as relates thereto, are not intended to include all of the structures in which my invention may be incorporated. It is, therefore, understood that my invention resides in the combination, arrangement and location of parts and in the details of construction, as hereinafter claimed and that changes in the precise embodiment of the invention can be made within the scope of what is claimed without departing from the spirit of the invention.

What I claim as new and desire to secure by Letters Patent is:

1. In a friction clutch, a driving shaft, a plurality of wedges, a clutch member mounted concentric of said shaft and having a beveled side having a plurality of grooves therein, an engaging member in each of said grooves, circularly retracting springs connecting said engaging members and received within the beveled side of said clutch member, a driven member and manually operative means adapted to actuate said wedges into simultaneous engagement with said engaging members whereby said engaging members are forced into uniform engaging contact with said clutch member whereby said clutch member is forced into clutching frictional engagement with said driven member.

2. In a friction clutch, a driving shaft, a sleeve splined thereon and formed with longitudinal grooves, wedges slidably mounted in said grooves, respectively, a clutch member operatively connected with said shaft and having a plurality of inclined grooves formed therein, engaging members in said inclined grooves, respectively, a driven member and manually operative means adapted to actuate said wedges into simultaneous engagement with said engaging members, whereby said engaging members force said clutch member into clutching frictional engagement with said driven member.

3. In a friction clutch, a driving shaft, a sleeve splined thereon and formed with a longitudinal groove, a wedge slidably mounted in said groove, a clutch member operatively connected with said shaft and having an inclined groove formed therein, an engaging member in said groove, a driven member and manually operative means adapted to actuate said wedge into engagement with said engaging member whereby said clutch member is forced into clutching frictional engagement wtih said driven member.

4. In a friction clutch, a driving shaft, a plurality of wedges slidably mounted longitudinally of said shaft, a clutch member rotatably connected with said shaft and having an inclined side having a plurality of angular grooves therein, cylindrical rollers, respectively, in said angular grooves, a driven member and manually operative means having operative connection with said wedges whereby said wedges are adapted to wedge said cylindrical rollers into engagement with said clutch member whereby said clutch member is forced into driving engagement with said driven member.

5. In a friction clutch, a driving shaft, a plurality of wedges slidably mounted longitudinally of said shaft, a clutch member rotatably connected with said shaft and having an inclined side having a plurality of grooves therein, cylindrical rollers, respectively, in said grooves, a driven member and manually operative means having operative connection with said wedges whereby said wedges are adapted to wedge said cylindrical rollers into engagement with said clutch member whereby said clutch member is forced into driving engagement with said driven member.

6. In a friction clutch, a driving shaft, a sleeve splined thereon and having a plurality of longitudinal grooves therein, a plurality of wedges, respectively, slidably mounted in said grooves, a clutch member mounted concentric of said shaft and having a plurality of angular grooves formed therein, a cylindrical roller in each of said angular grooves, a driven member and manually operative means having operative connection with said wedges whereby said wedges are adapted to force said rollers into simultaneous engagement with said clutch member and said clutch member is forced into driving engagement with said driven member.

7. In a friction clutch, a driving shaft, a sleeve splined thereon and formed with a plurality of spaced apart longitudinal grooves, a wedge slidably mounted in each of said grooves, a clutch member having connection with said shaft and having a plurality of spaced apart angular grooves, respectively, in alinement with said longitudinal grooves, an engaging member loosely mounted in each of said angular grooves, a driven member and manually operative means having operative connection with said wedges whereby operation of said manually operative means is adapted to slide said wedges, respectively, into engagement with said engaging members whereby said engaging members are adapted to force said clutch member into driving frictional engagement with said driven member.

8. In a friction clutch, a driving shaft, a sleeve splined thereon and formed with a plurality of spaced apart longitudinal grooves, a wedge slidably mounted in each of said grooves, a clutch member having connection with said shaft and having a plurality of spaced apart angular grooves, respectively, in alinement with said longitudinal grooves, an engaging member in each of said angular grooves, a driven member and manually operated means having operative connection with said wedges whereby operation of said manually operative means is adapted to slide said wedges, respectively, into engagement with said engaging members whereby said engaging members are adapted to force said clutch member into driving frictional engagement with said driven member.

9. In a friction clutch, a driving shaft, a sleeve splined thereon and formed with a plurality of spaced apart longitudinal grooves, a wedge slidably mounted in each of said grooves, a clutch member having a plurality of spaced apart angular grooves, respectively, in alinement with said longitudinal grooves, a cylindrical roller in each of said angular grooves, a driven member and manually operative means having operative connection with said wedges whereby operation of said manually operative means is adapted to slide said wedges, respectively, into engagement with said cylindrical rollers and said cylindrical rollers are caused to force said clutch member into clutching frictional engagement with said driven member whereby said driven member is rotated through suitable connections with said shaft.

10. In a friction clutch, a driving shaft, a sleeve splined thereon and formed with longitudinal grooves, a longitudinal wedge slidably mounted in each of said grooves, a clutch member rotatably connected with said shaft and having a beveled side, a plurality of cylindrical rollers positioned in said grooves, respectively, a driven member adjacent said clutch member and manually operative means adapted to simultaneously actuate said wedges into wedging engagement with said cylindrical rollers, respectively, whereby said clutch member is forced into driving engagement with said driven member.

11. In a friction clutch, a driving shaft, a sleeve splined thereon and formed with longitudinal grooves, a longitudinal wedge slidably mounted in each of said grooves, a clutch member rotatably connected with said shaft and having a beveled side, a plurality of cylindrical rollers positioned in said grooves, respectively, a driven member adjacent said clutch member and manually operative means adapted to actuate said wedges into wedging engagement with said cylindrical rollers, respectively, whereby said clutch member is forced into driving engagement with said driven member.

12. In a friction clutch, a driving shaft having a plurality of parallel spaced apart longitudinal grooves therein, a plurality of wedges slidably mounted in said grooves, respectively, a clutch member mounted around said shaft, a plurality of cylindrical rollers adjacent said clutch member and positioned in said grooves, respectively, a driven member and manually operative means adapted to actuate said wedges into wedging engagement with said cylindrical rollers, respectively, whereby the rollers are adapted to force said clutch member into frictional engagement with said driven member.

13. In a friction clutch, the combination of a shaft, a sleeve splined thereon and formed with longitudinal grooves, an idle member mounted concentrically about said sleeve, a friction member having a grooved inclined wall, a disk mounted adjacent said friction member and adapted to be frictionally engaged thereby and in meshing engagement with said idle member, said grooved inclined wall of said friction member forming angular openings which terminate adjacent the respective ends of said longitudinal grooves, engaging members in each of said angular openings, a wedge slidably mounted in each of said longitudinal grooves and means for sliding said wedges into engagement with said engaging members whereby said engaging members are adapted to simultaneously force said friction member into clutching engagement with said disk, substantially as and for the purposes specified.

14. In a friction clutch, the combination of a shaft, a sleeve splined thereon and formed with longitudinal grooves, an idle member mounted concentrically about said sleeve, a friction member having a grooved wall, a disk mounted adjacent said friction member and adapted to be frictionally engaged thereby and in meshing engagement with said idle member, said grooved wall of said friction member forming angular openings, engaging members in each of said angular openings, a wedge slidably mounted in each of said longitudinal grooves and means for sliding said wedges into engagement with said engaging members whereby said engaging members are adapted to simultaneously force said friction member into clutching engagement with said disk, substantially as and for the purposes specified.

15. In a friction clutch, the combination of a shaft, a sleeve splined thereon and formed with longitudinal grooves, a hub keyed to said sleeve, an idle member mounted concentric about said sleeve, a friction member keyed to said hub and having an inclined wall, a disk mounted adjacent said friction member and secured to said idle member, engaging members positioned in said grooves, respectively, and adjacent said inclined wall, a longitudinal wedge slidably mounted in each of said longitudinal grooves, and manually operative means for sliding said wedges simultaneously into engagement with said engaging members whereby said friction member is forced into driving engagement with said disk, substantially as and for the purposes specified.

16. In a friction clutch, the combination of a driving shaft, a spindle shaft, a sleeve splined on said driving shaft and having a plurality of parallel spaced apart longitudinal grooves therein, a bevel gear mounted to rotate concentrically about said sleeve, a hub keyed to said sleeve and having driving teeth integral therewith, a frictional member adjacent said hub and having inclined grooves therein, respectively, in alinement with said longitudinal grooves, a cylindrical roller in each of said inclined grooves, wedges slidable in said longitudinal grooves, respectively, a disk meshed with said gear and means for sliding said wedges whereby said friction member is forced into friction driving engagement with said disk.

17. In a friction clutch, the combination of a shaft, a sleeve splined thereon and formed with longitudinal grooves, an idler mounted concentric about said sleeve, a frictional member having grooved inclined walls, a disk mounted adjacent said frictional member and adapted to be frictionally engaged thereby and in meshing engagement with said idler, said grooved inclined walls of said frictional member forming angular openings which terminate adjacent the respective ends of said longitudinal grooves, engaging members in each of said angular openings, a wedge slidably mounted in each of said longitudinal grooves and means for sliding said wedges into engagement with said engaging members whereby said engaging members are adapted to simultaneously force said frictional member into clutching engagement with said disk, substantially as and for the purposes specified.

18. In a friction clutch, the combination of a shaft, a sleeve splined thereon and formed with longitudinal grooves, an idler gear mounted concentric about said sleeve, a friction member keyed to said sleeve and having an inclined wall, a disk mounted adjacent said member and secured to said gear, engaging members positioned in said grooves and engaging said inclined wall, a longitudinal wedge slidably mounted in each of said longitudinal grooves and manually operative means for sliding said wedges simultaneously into engagement with said engaging members whereby said frictional member is forced into clutching engagement with said disk, substantially as and for the purposes specified.

19. In a friction clutch, the combination of a driving shaft, a sleeve splined on said driving shaft and having a plurality of parallel spaced apart longitudinal grooves therein, a bevel gear mounted to rotate about said sleeve and having an extended hub, a disk secured to said hub, a clutch hub keyed to said sleeve and having driving teeth integral therewith, a friction member having teeth meshed with said hub teeth and having inclined grooves therein, respectively, in alinement with said longitudinal grooves, cylindrical rollers, respectively, combinedly received by said inclined grooves and said longitudinal grooves, a wedge slidably mounted in each of said longitudinal grooves and manually operative means adapted to slide said wedges simultaneously in one direction whereby said rollers are adapted to force said friction member into frictional driving engagement with said disk.

20. In a friction clutch, the combination of a driving shaft, a driven shaft, a sleeve splined on said driving shaft and having spaced apart longitudinal grooves therein, a gear mounted to rotate concentrically about said sleeve, a hub keyed to said sleeve and having internal clutch teeth, a disk mounted around said sleeve and in mesh with said teeth and having inclined grooves, respectively, in alinement with said longitudinal grooves, cylindrical rollers, respectively, combinedly received by said inclined grooves and said longitudinal grooves, a disk positioned adjacent said first disk and secured to said gear, wedges, respectively, slidably mounted in said longitudinal grooves, manually operative means adapted to move said wedges in one direction into engagement with said rollers whereby said rollers are forced into wedging engagement with said first disk whereby said first disk is forced into frictional driving engagement with said second disk thereby imparting rotary movement to said gear and means operatively connecting said gear with said driven shaft, whereby said driven shaft is rotated.

21. In a friction clutch, the combination of a driving shaft, a driven shaft, a sleeve splined on said driving shaft and having spaced apart longitudinal grooves therein, an idle member gear mounted to rotate concentrically about said sleeve, a hub keyed to said sleeve and having internal clutch teeth, a disk mounted around said sleeve and in mesh with said teeth and having inclined grooves, respectively, in alinement with said longitudinal grooves, cylindrical rollers, respectively, combinedly received by said inclined grooves and said longitudinal grooves, a disk positioned adjacent said first disk and in mesh with said gear, wedges, respectively, slidably mounted in said longitudinal grooves, manually operative means adapted to move said wedges in one direction into engagement with said rollers whereby said rollers are forced into wedging engagement with said first disk whereby said first disk is forced into frictional driving engagement with said second disk thereby imparting rotary movement to said idle member and means operatively connecting said idle member with said driven shaft, whereby said driven shaft is rotated.

22. In a friction clutch, a driving shaft, a driven shaft, a pair of sleeves splined to said driving shaft and each having spaced apart alined longitudinal grooves therein, a spacing sleeve mounted on said driving shaft and intermediate said pair of sleeves, longitudinal wedges slidably mounted in said alined grooves, respectively, and having their ends beveled and each having a centrally disposed transverse groove therein, a collar mounted on said spacing sleeve and received in said transverse grooves and having a circumferential groove therein, a fork in said circumferential groove, manually operative means having operative connection with said fork whereby said collar is adapted to be moved longitudinally on said spacing sleeve and simultaneously slide said wedges longitudinally of said driving shaft, the directional movement of said manually operative means controlling the slidable directional movement of said wedges, a bevel gear rotatably mounted around each of said pair of sleeves, respectively, and each having an extended hub having external teeth thereon, a plurality of spaced apart disks mounted on each of said bevel gear hubs and meshing with said teeth thereof, a gear keyed to said driven shaft and in permanent mesh with both of said bevel gears, a clutch hub keyed to each of said pair of sleeves, respectively, and having internal teeth, a plurality of disks mounted in each of said hubs, respectively, and in mesh with the internal teeth and one of each set of said last disks having a plurality of inclined grooves therein, respectively, in alinement with said longitudinal grooves, a cylindrical roller in each end of each of said longitudinal grooves, respectively, and extending into the adjacent incline groove and adapted to be engaged by the adjacent beveled end of one of said wedges, whereby manual operation of said manually operative means is adapted to force one of said grooved disks into frictional driving engagement with the adjacent disks whereby rotary movement is imparted to said driven shaft.

23. In a friction clutch, a driving shaft, a driven shaft, a pair of sleeves splined to said driving shaft and each having spaced apart longitudinal grooves therein and in alinement with the grooves in the adjacent sleeve, a spacing sleeve mounted on said driving shaft and intermediate said pair of sleeves, longitudinal wedges, respectively, slidably mounted in said alined grooves and having their ends beveled and having each a centrally disposed transverse groove therein, a collar mounted on said spacing sleeve and received in said transverse grooves, and having a circumferential groove therein, a fork in said circumferential groove, manually operative means having operative connection with said fork whereby said collar is adapted to be moved longitudinally on said spacing sleeve and simultaneously slide said wedges longitudinally of said driving shaft, the directional movement of said manually operative means controlling the slidable directional movement of said wedges, a gear mounted around each of said pair of sleeves, respectively, and each having an extended hub having external teeth thereon, a plurality of spaced apart disks mounted on each of said gear hubs and meshing with said teeth thereof, a gear keyed to said driven shaft and in permanent mesh with both of said first gears, a clutch hub keyed to each of said pair of sleeves, respectively, and having internal teeth therein, a disk mounted in each of said hubs, respectively, and in mesh with its internal teeth having a plurality of inclined grooves therein in alinement with said longitudinal grooves, respectively, and a cylindrical roller in each end of each of said longitudinal grooves and adapted to force one of said grooved disks into clutching and driving engagement with the adjacent disks when said manually operative means are actuated.

24. In a friction clutch, a driving shaft, a driven shaft, a pair of sleeves splined to said driving shaft and each having spaced apart longitudinal grooves therein and in alinement with the grooves in the adjacent sleeve, a spacing sleeve mounted on said driving shaft and intermediate said pair of sleeves, longitudinal wedges, respectively, slidably mounted in said alined grooves and having their ends beveled and each having a centrally disposed transverse groove therein, a collar mounted on said spacing sleeve and received in said transverse grooves, and having a circumferential groove therein, a fork in said circumferential groove, manually operative means having operative connection with said fork whereby said collar is adapted to be moved longitudinally on said spacing sleeve and simultaneously slide said wedges longitudinally of said driving shaft, the directional movement of said manually operative means controlling the slidable directional movement of said wedges, a gear mounted around each of said pair of sleeves, respectively, and each having an extended hub having external teeth thereon, a plurality of spaced apart disks mounted on each of said gear hubs and meshing with said teeth thereof, a gear keyed to said driven shaft and in permanent mesh with both of said first gears, a clutch hub keyed to each of said pair of sleeves, respectively, and having internal teeth therein, a disk mounted in each of said hubs, respectively, and in mesh with its internal teeth having a plurality of inclined grooves therein in alinement with said longitudinal grooves, respectively, a cylindrical roller in each end of each of said longitudinal grooves and adapted to force one of said grooved disks into clutching and driving engagement with the adjacent disks when said manually operative means are actuated, and a pair of nuts threaded to the outer ends of said pair of sleeves, respectively, and adapted when screwed inwardly to eliminate the lost motion of the respective frictional engaging parts of said clutch.

WILLIAM C. DE ROO.